United States Patent [19]

Edagawa et al.

[11] Patent Number: 4,923,291
[45] Date of Patent: May 8, 1990

[54] OPTICAL AMPLIFICATION

[75] Inventors: Noboru Edagawa, Tokyo; Kiyofumi Mochizuki, Hachioji; Yoshinao Iwamoto, Wakayama, all of Japan

[73] Assignee: Kokusai Denshin Denwa Kabushiki Kaisha, Tokyo, Japan

[21] Appl. No.: 219,600

[22] Filed: Jul. 15, 1988

[30] Foreign Application Priority Data

Jul. 23, 1987 [JP] Japan ................... 62-182244

[51] Int. Cl.$^5$ .......................... G02B 5/30; G02F 1/00
[52] U.S. Cl. .................................. 350/389; 350/401; 330/4.3; 372/27; 455/609; 455/616
[58] Field of Search ............... 350/389, 397, 169, 384, 350/390, 400, 401; 372/27; 455/600, 609, 612, 616, 617, 619; 330/4.3

[56] References Cited

U.S. PATENT DOCUMENTS

| 4,019,151 | 4/1977 | Brueckner et al. | 330/4.3 |
| 4,186,353 | 1/1980 | Boutineau | 330/4.3 |
| 4,364,014 | 12/1982 | Gray | 330/4.3 |

FOREIGN PATENT DOCUMENTS

| 0248265 | 8/1987 | German Democratic Rep. | 372/27 |
| 0105129 | 6/1983 | Japan | 330/4.3 |
| 8607513 | 12/1986 | PCT Int'l Appl. | 455/616 |
| 2199713 | 7/1988 | United Kingdom | 455/616 |

OTHER PUBLICATIONS

G. Grobkopf et al., "Optical Amplifier Configurations with Low Polarization Sensitivity", Electronic Letters, Dec. 3, 1987, vol. 23, No. 25, pp. 1387-1388.

Primary Examiner—Bruce Y. Arnold
Assistant Examiner—R. D. Shafer
Attorney, Agent, or Firm—Emmanuel J. Lobato; Robert E. Burns

[57] ABSTRACT

An optical amplification method or system for an optical communication system which transmits signal light from the transmitting side to the receiving side via an optical transmission medium formed by an optical fiber or space. In accordance with the present invention, the signal light entered a certain state of polarization in at least one part of the transmitting side, the receiving side and the optical transmission medium is separated into two orthogonal polarized waves by a polarizing beam coupler/splitter. The two polarized waves are amplified by optical amplifiers disposed in correspondence to their state of polarization, respectively. The amplified orthogonal polarized waves are combined together by another polarizing beam coupler/splitter.

6 Claims, 2 Drawing Sheets

OPTICAL AMPLIFICATION

BACKGROUND OF THE INVENTION

The present invention relates to an optical transmission system which utilizes an optical fiber or space as an optical transmission medium and, more particularly, to an optical amplification system which amplifies signal light in any state of polarization.

Practical optical fiber communication systems currently utilize an opto-electronic and electro-optical conversion for repeating optical signals, which involves converting an optical signal into an electric signal, amplifying and waveformshaping the electric signal, and driving a semiconductor laser by the amplified electric signal.

On the other hand, there has been proposed, as a new way of repeating optical signals, an optical amplification system, which directly amplifies an optical signal. A repeating system utilizing optical amplification is advantageous over conventional opto-electric and electro-optical conversion repeating systems, since circuits in a repeater can be simplified in optical amplification systems and since wavelength-division-multiplexed signals or frequency-division-multiplexed signals at a desired transmission rate can be also amplified simultaneously by one optical amplifier. Besides, in a case where an optical gain is not dependent on the direction of the optical signal, bidirectional optical signals can be amplified simultaneously by one optical amplifier.

Optical amplifiers available now are ones that employ semiconductor lasers, or optical fiber Raman or Brillouin amplifiers which utilize a stimulated scattering phenomenon which occurs in an optical fiber.

However, even if the incident light level is fixed, there arises a problem that a stable output cannot be obtained.

SUMMARY OF THE INVENTION

It is therefore an object of the present invention to provide optical amplification method and system each of which provides a constant amplification regardless of the state of polarization of incident light.

To attain the above object, the optical amplification method or system of the present invention, for use in an optical communication system which transmits signal light from the transmitting side to the receiving side over an optical transmission medium formed by an optical fiber or space, is characterized by an arrangement in which the signal light entered a certain state of polarization in at least a part of the transmitting side, the optical transmission medium and the receiving side is separated by a polarizing beam coupler/splitter into two orthogonal polarized waves; the two polarized waves thus separated are amplified by optical amplifiers disposed in correspondence to the separated polarized waves, respectively; and thus the amplified orthogonal polarized waves are coupled together by another polarizing beam coupler/splitter.

BRIEF DESCRIPTION OF THE DRAWINGS

The present invention will be described in detailed below in comparison with prior art with reference to the accompanying drawings, in which.

DETAILED DESCRIPTION

To make differences between prior art and the present invention clear, an example of conventional a optical amplifier, which is employed in the present invention, will first be described.

Figure 1:
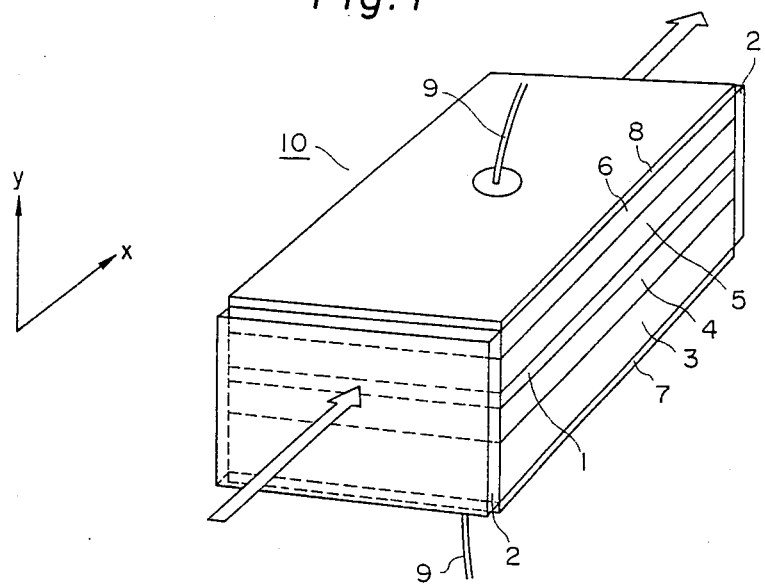
FIG. 1 is a schematic diagram of a conventional traveling-wave semiconductor laser optical amplifier but employed in the present invention.

FIG. 1 shows a typical example of a conventional traveling-wave semiconductor laser optical amplifier using a semiconductor laser. The laser shown in FIG. 1 is exactly identical in construction with an ordinary semiconductor laser. In this instance, however, a pair of opposed facets which form an optical resonator are each vapor-deposited with an antireflection film 2 of, for instance, SiO so that no laser oscillation may readily be caused by spontaneous emission of light in an light emitting layer 1 which performs an optical amplifying operation, input signal light being incident to the light emitting layer 1 through one of such facets and amplified output signal light being emitted through the other facet.

The above-mentioned structure is obtained by growing a clad layer 4, the light emitting layer 1, a clad layer 5, and a cap layer 6 one after another on a substrate 3 through liquid phase epitaxy. The clad layers 4 and 5 are intended to confine holes and electrons, i.e. carriers in the light emitting layer 1 and confine light therein widthwise thereof. The top and bottom surfaces of this structure are covered with ohmic electrodes 7 and 8, respectively. By a forward current flow across the above electrodes through leads 9, this semiconductor laser operates as an optical amplifier which has an optical gain according to the magnitude of the current being supplied.

By injecting, as incident light, into the semiconductor laser 10 biased to a state ready for oscillation, signal light having propagated in an optical fiber (not shown) and having the same wavelength as the oscillation wavelength of the semiconductor lazer 10, only the wavelength component of the incident light (the signal light) is amplified by stimulated emission. Various experiments have been conducted on this type of optical amplifier, and much effort has been made to develop them and are regarded as one of the promising optical amplifiers in future because it is small in size and low in power consumption. In some of the optical amplifiers, however, the optical gain changes considerably according to the state of polarization of the incident light. In the case of semiconductor laser amplifiers, for example, it has been reported that an optical gain varies by about 10 dB depending on whether the incident light is polarized in the TE mode (in the x-axis direction parallel to the light emitting layer) or TM mode (in the y-axis direction perpendicular to the light emitting layer) (Electronics Letters, Vol. 21, 1986, p. 1105–1107).

Figure 2:
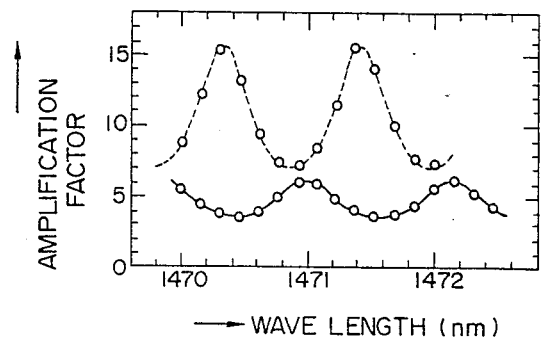
FIG. 2 is a graph showing the polarization dependence characteristic of the optical gain of the conventional semiconductor laser optical amplifier.

FIG. 2 is a polarization dependence characteristics diagram showing, for each mode, the relationship between the wavelength and the optical gain obtained in the case where optical amplification was performed using a conventional semiconductor laser. In FIG. 2, the broken line and the solid line indicate wavelength-optical gain characteristics in the TE mode (in the x-axis direction) and in the TM mode (in the y-axis direction), respectively, and it is shown that the optical gain in the two modes differ by about 10 dB from each other in the vicinities of 1470.3 and 1471.4 nanometers. The state of polarization of light, through an ordinary optical fiber, varies in a delicate way according to a change in the ambient temperature of the optical fiber and external force applied thereto. On this account, the state of polarization of the optical signal fed into the optical amplifier after propagation through the optical fiber varies with time so that the output from the optical amplifier fluctuates because of the difference in optical gain between the TE and TM components. Accordingly, even if the incident light level is fixed, there arises a problem that a stable output cannot be obtained.

With reference to the accompanying drawings, the present invention will hereinafter be described in detail.

Figure 3:
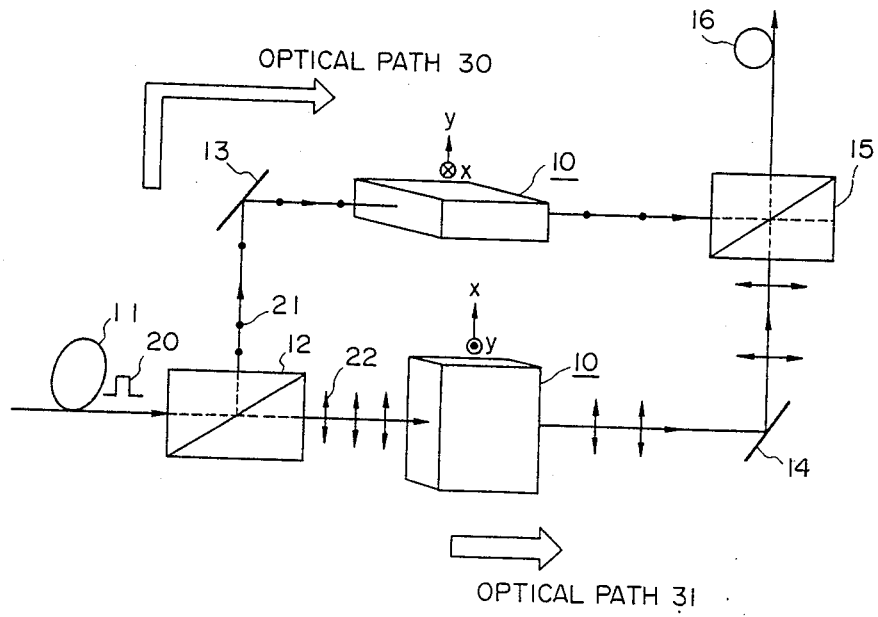
FIG. 3 is a schematic diagram of the optical repeating system according to the present invention.

FIG. 3 is a schematic diagram explanatory of the optical amplification system according to the present invention. Reference numerals 11 and 16 indicate optical fibers, 12 and 15 polarizing beam couplers/splitters such as polarizing beam splitters, 10 optical amplifiers each using, for example, a semiconductor laser, 13 and 14 reflectors such as mirrors, 20 signal light, 21 signal light of a horizontally polarized component of linearly polarized waves into which the signal light 20 is separated orthogonally by the polarizing beam coupler/splitter 12, 22 signal light of a vertically polarized wave component (In this case, the component vertical to the plane of the drawing is defined to be the vertically polarized wave component.), 30 an optical path of the signal light 21 of the horizontally polarized wave component, and 31 an optical path of the signal light 22 of the vertically polarized wave component. Incidentally, the polarized state of the coupled signal light may also be controlled by, for example, wave plates in the optical paths 30 and 31 in front of the polarized light coupler/splitter 15, though not shown.

Next, the operation of this system will be described.

The optical signal 20 having propagated in the optical fiber 11 is separated by the polarizing beam coupler/splitter 12 into the linearly polarized waves 21 and 22 orthogonal to each other. A traveling-wave semiconductor laser optical amplifier is used as the optical amplifier 10. In general, the semiconductor laser optical amplifier 10 provides a higher optical gain for light of the TE mode; therefore, in the present invention, the optical amplifiers 10 are disposed as shown so that the two separated orthogonal polarized waves 21 and 22 become of the TE mode in the optical amplifiers 10, thereby ensuring that the both amplifiers provide the same optical gain. This can be achieved not only by such an arrangement as shown but also by displacing the axes of polarization of the waves 90 degrees apart through use of polarization maintaining fibers. Further, since the ordinary polarization beam coupler/splitter 12 (15) provides an extinction ratio of more than 30 dB, output fluctuations due to its insufficient degree of separation are substantially negligible. The polarized wave components amplified by the optical amplifiers 10 are combined by the polarizing beam coupler/splitter 15 into a composite optical signal for propagation in the optical fiber 16. In order that input optical signals in any state of polarization may be amplified at exactly the same optical gain, the total optical gain including an optical gain obtained at the optical amplifier 10 and lost through the optical path 30, should be equal to the total optical gain including an optical gain obtained at the optical amplifier 10 and lost through the optical path 31. Moreover, an optical path difference between the optical paths 30 and 31 must be reduced, because it causes what is called a polarization dispersion, degrading the transmission performance. An allowable limit for the optical path difference is determined mainly by the following points.

Letting the bit rate and the velocity of signal light be represented by B (bps) and C (m/s), respectively, the spatial length which is occupied by one bit is C/B (m), and the optical path difference which provides a power penalty of 1.5 dB is a value of 0.22 C/B (m). Accordingly, in a case where only one stage of this optical amplifying devices is used, if the power penalty is 1.5 dB, then the optical path difference needs only to be less than 66 mm for a bit rate of 1 Gbps. In a multistage repeating system comprising N stages of amplifying devices, since the influence of the optical path difference in each stage is accumulated in the worst case, the optical path difference allowable for each stage is 0.22 C/B/N (m), and in the case where the number of stages is 10 and the bit rate is 1 Gbps, the allowable optical path difference is a value of 6.6 mm.

As described above, the present invention permits constant amplification of incident light regardless of its state of polarization, by separating the incident signal light into orthogonal linearly polarized waves, amplifying them by the optical amplifiers 10 in the same linearly polarized state and then combining them into a composite optical signal.

While in the above the present invention has been described in connection with the case of using the travelingwave semiconductor laser optical amplifiers, it is also possible to employ any other optical amplifiers which have the polarization dependence, such as optical fiber Raman and Brillouin amplifiers using a polarization maintaining optical fiber, and the separation of the incident signal light is not limited specifically to the linear polarization according to the optical amplifier used.

Moreover, if the optical amplifier is capable of amplification at the same level as in the case of, for example, the semiconductor laser optical amplifier regardless of which one of opposed facet is used for receiving incident light, it is also possible to apply the signal light 20 from the optical fiber 16 and take out the composite signal from the optical fiber 11 in FIG. 3; namely, bidirectional amplification can also be achieved with the same arrangement.

In addition, an optical communication receiving system may also be formed by disposing a photodetector in place of one of the optical fibers.

Although in the above the present invention has been described with regard to the case where optical fibers are used as optical transmission medium, the invention is also applicable to an inter-building optical communication system or a communication system which utilizes space as an optical transmission medium, such as an inter-satellite communication system which is now regarded as a promising future communication system.

As described above, according to the present invention, signal light having entered a certain state of polarization as a result of propagation in an optical fiber is separated into orthogonal polarized waves, which are amplified by optical amplifiers disposed so that they are applied thereto in the same state of polarization, and the amplified outputs are coupled together; therefore, the signal light can be amplified at a constant optical gain regardless of the state of polarization. Accordingly, the present invention eliminates the need of polarization control of incident light which is required in the case of using an optical amplifier which has polarization dependence, and permits the reduction of the system margin corresponding to a change in the optical gain, thus allowing much ease in the design of an optical communication system employing optical amplifiers. Besides, when the optical amplifiers are bidirectional, they can be employed for bidirectional optical amplification. Thus, the present invention is of great utility in practical use.

What we claim is:

1. An optical amplification method for an optical communication system which transmits signal light from a transmitting side to a receiving side via an optical transmission medium, comprising:
   separating the signal light into two orthogonally polarized beams by a first polarizing beam coupler/splitter;
   amplifying each orthogonally polarized beam by an optical amplifier, each of said optical amplifiers being oriented with respect to each polarized beam to achieve maximum optical gain, and
   combining together the two orthogonally amplified, polarized beams by a second polarizing beam coupler/splitter.

2. An optical amplification method according to claim 1, in which each of the optical amplifiers is a travelling-wave semiconductor laser optical amplifier.

3. An optical amplification method for an optical communication system which transmits signal light having a particular instantaneously fluctuated state of polarization from a transmitting side to a receiving side via an optical transmission medium, comprising:
   separating the signal light into two orthogonally polarized beams by a first polarizing beam coupler/splitter;
   amplifying each orthogonally polarized beam by an optical amplifier having a polarization dependency, each of said optical amplifiers being oriented with respect to each polarized beam to achieve maximum optical gain and to provide two orthogonally amplified, polarized beams of substantially the same optical gain level; and
   combining the two orthogonally amplified, polarized beams by a second polarized beam coupler/splitter.

4. An optical amplification method according to claim 3, in which each of the optical amplifiers is a light travelling wave semiconductor laser, or a Brillouin amplifier or an optical fiber Raman amplifier using a polarization maintaining optical fiber.

5. An optical amplification system for an optical communication system which transmits signal light having a particular instantaneously fluctuated state of polarization from a transmitting side to a receiving side via an optical transmission medium, comprising:
   a first polarizing beam coupler/splitter for separating the signal light into two orthogonally polarized beams;
   a first optical path and a second optical path provided to each transmit one of the two orthogonally polarized beams respectively; two optical amplifiers each having a polarization dependency, wherein one of said optical amplifiers is located in said first optical path and the other optical amplifier is located in said second optical path for amplifying each orthogonally polarized beam, each of said optical amplifiers being oriented with respect to each polarized beam to achieve maximum optical gain and to provide two orthogonally amplified, polarized beams of substantially the same optical gain level from the first path and the second path, respectively; and
   a second polarizing beam coupler/splitter optically coupled to the first optical path and the second optical path for combining the two orthogonally amplified, polarized beams.

6. An optical amplification system according to claim 5, in which each of the optical amplifiers is a light travelling wave semiconductor laser comprising a Brillouin amplifier or an optical fiber Raman amplifier using a polarization maintaining optical fiber.

* * * * *